(12) United States Patent
Cheon

(10) Patent No.: US 12,179,854 B2
(45) Date of Patent: Dec. 31, 2024

(54) STEERING CONTROL DEVICE AND METHOD

(71) Applicant: HL MANDO CORPORATION, Gyeonggi-do (KR)

(72) Inventor: SeungWoo Cheon, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 271 days.

(21) Appl. No.: 17/830,330

(22) Filed: Jun. 2, 2022

(65) Prior Publication Data

US 2022/0396307 A1 Dec. 15, 2022

(30) Foreign Application Priority Data

Jun. 8, 2021 (KR) .......................... 10-2021-0073869

(51) Int. Cl.
*B62D 5/04* (2006.01)
*B62D 1/04* (2006.01)
*B62D 6/10* (2006.01)
*B62D 15/02* (2006.01)
*G01L 5/22* (2006.01)

(52) U.S. Cl.
CPC ............ *B62D 5/0463* (2013.01); *B62D 1/04* (2013.01); *B62D 1/043* (2013.01); *B62D 15/0215* (2013.01); *G01L 5/221* (2013.01); *B62D 6/10* (2013.01)

(58) Field of Classification Search
None
See application file for complete search history.

(56) References Cited

U.S. PATENT DOCUMENTS

| | | | | |
|---|---|---|---|---|
| 7,019,623 B2* | 3/2006 | Klausner | .................. | B62D 1/06 340/545.4 |
| 7,520,365 B2* | 4/2009 | Fukuba | .................. | B62D 6/008 180/402 |
| 9,248,851 B2* | 2/2016 | Van'tZelfde | ........... | B62D 1/046 |
| 10,202,146 B2* | 2/2019 | Endo | .................... | B62D 5/0463 |
| 10,377,303 B2* | 8/2019 | McNew | ................ | B60W 50/14 |
| 10,399,591 B2* | 9/2019 | Chandy | .................. | B62D 1/043 |
| 10,926,786 B2* | 2/2021 | Jendrowski | ............ | B62D 1/046 |
| 11,094,080 B2* | 8/2021 | Schiebener | ............ | G06V 10/82 |
| 11,167,768 B2* | 11/2021 | Shiraishi | ........... | B60W 60/0055 |
| 11,608,103 B2* | 3/2023 | Morita | ..................... | B62D 1/06 |
| 11,673,598 B2* | 6/2023 | Nakajima | .............. | B60K 35/00 280/779 |
| 11,702,138 B2* | 7/2023 | Yasuda | ................ | B62D 15/025 701/41 |

(Continued)

FOREIGN PATENT DOCUMENTS

CN 107891909 A * 4/2018 ............. B62D 1/043
CN 115447662 A * 12/2022 ............... B62D 1/04

(Continued)

*Primary Examiner* — Kevin R Steckbauer
(74) *Attorney, Agent, or Firm* — Womble Bond Dickinson (US) LLP

(57) ABSTRACT

According to the disclosure, the steering control device and method may enhance the driver's steering feeling by correcting the steering torque due to a difference in linear distance despite a difference in the linear distance from the rotation axis according to the position of the pressure applied to the steering wheel shaped so that the linear distance from the rotation axis increases/decreases.

18 Claims, 8 Drawing Sheets

(56) References Cited

U.S. PATENT DOCUMENTS

| | | | | |
|---|---|---|---|---|
| 2007/0219691 | A1* | 9/2007 | Fukuba | B62D 6/008 |
| | | | | 701/42 |
| 2012/0144954 | A1* | 6/2012 | Takayasu | B62D 1/04 |
| | | | | 74/552 |
| 2016/0068103 | A1* | 3/2016 | McNew | B60W 50/0097 |
| | | | | 701/23 |
| 2017/0015351 | A1* | 1/2017 | Endo | B62D 6/00 |
| 2018/0093700 | A1* | 4/2018 | Chandy | B62D 1/043 |
| 2019/0300013 | A1* | 10/2019 | Shiraishi | B60W 50/10 |
| 2020/0353971 | A1* | 11/2020 | Nakajima | B62D 1/04 |
| 2021/0370953 | A1* | 12/2021 | Gillespie | G01L 5/221 |
| 2022/0204016 | A1* | 6/2022 | Lerner | B60W 60/0059 |
| 2022/0315091 | A1* | 10/2022 | Morita | B62D 1/10 |
| 2022/0371660 | A1* | 11/2022 | Yasuda | B62D 15/025 |
| 2022/0379956 | A1* | 12/2022 | Williams | B62D 6/007 |
| 2022/0396307 | A1* | 12/2022 | Cheon | B62D 15/0215 |
| 2022/0410971 | A1* | 12/2022 | Yasuda | B62D 15/025 |
| 2024/0010266 | A1* | 1/2024 | Cimatti | B62D 5/006 |
| 2024/0182110 | A1* | 6/2024 | Nakamura | B62D 1/06 |

FOREIGN PATENT DOCUMENTS

| | | | | |
|---|---|---|---|---|
| CN | 115489585 | A * | 12/2022 | |
| CN | 117184118 | A * | 12/2023 | B60K 35/00 |
| DE | 102017006592 | A1 * | 3/2018 | |
| DE | 102022114241 | A1 * | 12/2022 | B62D 1/04 |
| JP | 2020185805 | A * | 11/2020 | B60H 1/00292 |
| JP | 7183943 | B2 * | 12/2022 | B60H 1/00292 |

* cited by examiner

STEERING CONTROL DEVICE AND METHOD

CROSS-REFERENCE TO RELATED APPLICATION

This application claims priority from Korean Patent Application No. 10-2021-0073869, filed on Jun. 8, 2021, which is hereby incorporated by reference for all purposes as if fully set forth herein.

BACKGROUND

Field

The present embodiments relate to a steering control device and method for correcting the steering torque.

Description of Related Art

Power steering systems for reducing the driver's steering force when steering the vehicle include hydraulic power steering (HPS) systems that assist the driver's steering force using the hydraulic pressure formed by a hydraulic pump and motor driven power steering systems ('MDPS') that assist the driver's steering force using the output torque of an electric motor.

When the MDPS system among them performs a steering assist function according to the driver's manipulation of the steering wheel, the output torque (i.e., assist torque) of the electric motor (steering motor) for assisting steering may be controlled according to the driving condition of the vehicle. Thus, the MDPS system provides much better steering performance and steering sensation as compared with the hydraulic power steering system.

Accordingly, recent vehicles have been widely adopting MDPS systems capable of changing and controlling the steering assist force generated by the motor output according to driving conditions.

The MDPS system may include sensors including a steering angle sensor for detecting the steering angle according to the driver's manipulation of the steering wheel and a torque sensor for detecting the steering torque applied to the steering wheel by the driver, a controller (MDPS ECU), and a steering motor (MDPS motor). The MDPS system may further include other sensors, such as a wheel velocity sensor, an engine rpm sensor, and a yaw rate sensor.

The controller receives and obtains driver steering input information, such as steering angle, steering angular velocity, or steering torque, i.e., steering wheel manipulation state information, and vehicle state information, such as vehicle velocity, wheel velocity, engine rpm, and yaw rate, from the sensors to control the driving and output of the steering motor.

Upon detecting the steering torque, which is a torque inputted by the driver, by the torque sensor, the controller controls the driving of the steering motor according to the detected driver steering torque to generate an adjusted torque (hereinafter, referred to as 'assist torque') for assisting steering. The output of the steering motor is controlled based on the generated assist torque, and the steering motor may assist the driver's steering force.

If the steering wheel has a circular shape, and the distance from the rotation axis of the steering wheel remains the same, although the position of the driver's grip on the steering wheel is changed, the distance between the position of the grip and the rotation axis of the steering wheel stays equal, so that an assist torque is generated based on a uniform steering torque.

In contrast, in a case where the steering wheel has a circular shape but the distance from the rotation axis of the steering wheel differs or if the shape of the steering wheel is not circular, if the position of the driver's grip on the steering wheel is changed, although the driver applies the same force, the steering torque may be varied due to a difference in the distance between the grip position and the rotation axis of the steering wheel. Accordingly, the driver may have an irregular steering feeling upon generating an assist torque based on the non-uniform steering torque.

BRIEF SUMMARY

In the foregoing background, the disclosure provides a steering control device and method capable of enhancing the driver's steering feeling by correcting the steering torque due to a difference in linear distance despite a difference in the linear distance from the rotation axis according to the position of the pressure applied to the steering wheel shaped so that the linear distance from the rotation axis increases/decreases.

To achieve the foregoing objectives, in an aspect, the disclosure provides a steering control device comprising a steering wheel shaped to increase/decrease in a linear distance to a rotation axis, a pressure sensor provided in the steering wheel to detect a pressure applied to the steering wheel, and a controller determining a grip position based on the pressure applied to the steering wheel detected by the pressure sensor, calculating a steering torque correction coefficient based on a linear distance from the rotation axis of the steering wheel to the determined grip position, correcting a steering torque based on the steering torque correction coefficient to calculate a final steering torque, and controlling an output of a motor based on the final steering torque.

In another aspect, the disclosure provides a steering control method comprising a pressure detection step detecting a pressure applied to a steering wheel shaped to increase/decrease in a linear distance from a rotation axis, a steering torque correction coefficient calculation step determining a grip position based on the detected pressure applied to the steering wheel and calculating a steering torque correction coefficient based on a linear distance from the rotation axis of the steering wheel to the determined grip position, and a final steering torque calculation step calculating a final steering torque by correcting a steering torque based on the steering torque correction coefficient.

According to the disclosure, the steering control device and method may enhance the driver's steering feeling by correcting the steering torque due to a difference in linear distance despite a difference in the linear distance from the rotation axis according to the position of the pressure applied to the steering wheel shaped so that the linear distance from the rotation axis increases/decreases.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
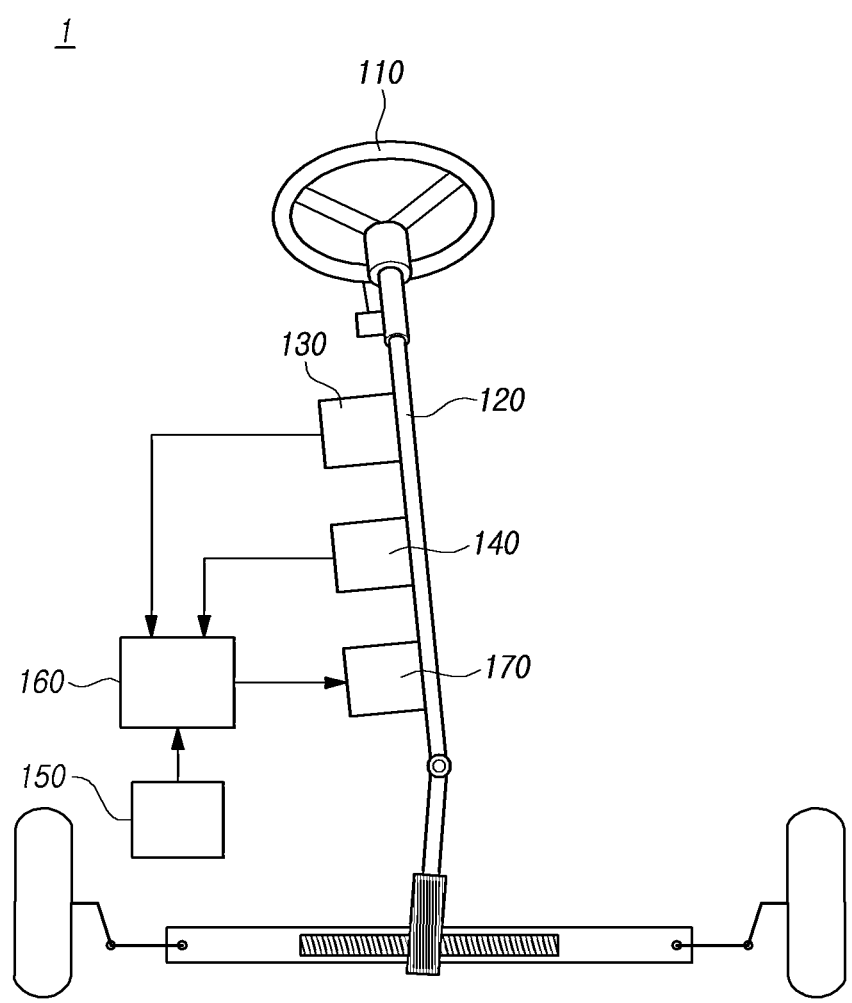
FIG. 1 is a view schematically illustrating a steering control system according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A steering control device 10 is described below with reference to the accompanying drawings, according to an embodiment of the disclosure.

FIG. 1 is a view schematically illustrating a steering control system 1 according to an embodiment.

Referring to FIG. 1, the steering control system 1 may include a steering wheel 110, a shaft 120, a steering angle sensor 130, a torque sensor 140, a velocity sensor 150, a controller 160, and a steering motor 170.

The steering wheel 110 may be rotated by the user's manipulation. The steering wheel 110 may be coupled to the shaft 120. The shape of the steering wheel 110 may be circular as shown in FIG. 1, but is not limited thereto. The rotation axis of the steering wheel 110 may mean a center point coupled to the shaft 120.

The shaft 120 may be coupled to the steering wheel 110 and rotated together with the steering wheel 110. The shape of the shaft 120 may be a cylindrical shape.

The steering angle sensor 130 may detect the steering angle generated by the rotation of the steering wheel 110. The steering angle sensor 130 may output a steering angle signal indicating information about the steering angle.

The above-described steering angle indicates the rotational position of the steering wheel 110, and the steering torque indicates a driver input torque that is a torque applied to the steering wheel 110 by the driver during steering (that is, a torque by which the driver rotates the steering wheel).

Further, the steering angular velocity is a value of the rotational angular velocity of the steering wheel 110 obtained through a separate sensor or a differential signal of the steering angle sensor signal (steering angle signal), and means the velocity at which the driver turns the steering wheel 110, that is, the steering velocity.

The torque sensor 140 may detect a steering torque generated by rotation of the steering wheel 110. When the steering torque is detected, the torque sensor 140 may output a steering torque signal indicating information about the steering torque.

The steering torque may mean a torque applied to the torsion bar present between the input axis and the output axis of the shaft 120. Therefore, the steering torque may be detected if the steering wheel 110 is not being rotated, but the steering wheel 110 is in a rotated state out of the center point.

The velocity sensor 150 may detect the velocity of the vehicle and output a vehicle velocity signal indicating information about the vehicle velocity.

The controller 160 may receive the steering angle signal output by the steering angle sensor 130, the steering torque signal output by the torque sensor 140, and the vehicle velocity signal output by the velocity sensor 150. The controller 160 may receive the steering angle signal and the steering torque signal, calculate a rack stroke for providing a steering assist force, and output a command current corresponding to the rack stroke to the steering motor 170.

The controller 160 may be implemented in hardware and software, such as an electronic control unit (ECU) including a microcontroller unit (MCU) 160, an inverter, and a printed circuit board (PCB).

The steering motor 170 may be driven by receiving the command current from the controller 160. In other words, assist torque may be generated.

As the steering motor 170 rotates, the shaft 120 may be rotated and the wheels are moved to the left or right by the operation of the rack-and-pinion, thereby turning the vehicle.

Figure 2:
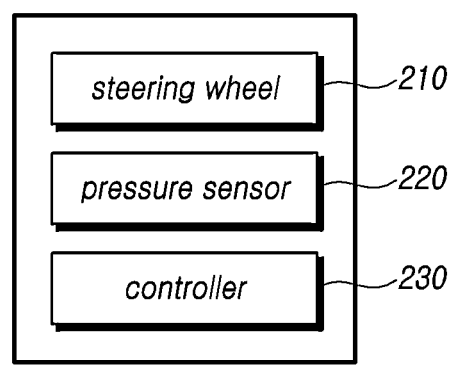
FIG. 2 is a block diagram illustrating an steering control device according to an embodiment of the disclosure.

FIG. 2 is a block diagram illustrating a steering control device 10 according to an embodiment of the disclosure.

Referring to FIG. 2, according to an embodiment of the disclosure, a steering control device 10 may include a steering wheel 210, a pressure sensor 220, and a controller 230.

According to an embodiment of the disclosure, the steering control device 10 may be part of a device that performs an advanced driver assistance system (ADAS) function that is equipped in a host vehicle to provide information helpful for driving the host vehicle or assist the driver in the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

Referring to FIG. 2, the steering control device 10 of the disclosure may include a steering wheel 210 shaped to increase/decrease in the linear distance from the rotation axis.

The steering wheel 210 may be shaped to increase/decrease in the linear distance from the rotation axis. For example, the steering wheel 210 may be shaped to include a plurality of areas in which the linear distance increases/decreases depending on the position of the steering wheel 210 where pressure is applied from the rotation axis of the steering wheel 210. In this case, the plurality of areas may include a first area in which the linear distance from the rotation axis of the steering wheel 210 increases clockwise, a second area in which the linear distance from the rotation axis of the steering wheel 210 decreases clockwise, a third area in which the linear distance from the rotation axis of the steering wheel 210 increases counterclockwise, and a fourth area in which the linear distance from the rotation axis of the steering wheel 210 decreases counterclockwise.

The shape of the steering wheel 210 may be an octagonal shape, but is not limited thereto. For example, the shape of the steering wheel 210 may be a triangular, quadrangular, or hexagonal shape, or may be a circular shape as conventional. In other words, if the rotation axis of the steering wheel 210 is provided to depart off the center point of the steering wheel 210, embodiments of the disclosure may be applied even when the steering wheel 210 is circular in shape. In other words, embodiments of the disclosure may be applied to any shape in which the linear distance from the rotation axis of the steering wheel 210 may increase/decrease, without limitations.

Referring to FIG. 2, the steering control device 10 of the disclosure may include a pressure sensor 220 provided in the steering wheel 210 to detect the pressure applied to the steering wheel 210.

The pressure sensor 220 may be provided in the steering wheel 210 to detect the pressure applied to the steering wheel 210. However, without limited thereto, the pressure sensor 220 may be provided on the rear surface of the steering wheel 210 to detect the pressure applied to the steering wheel 210. In other words, the pressure sensor 220 may be provided in any position where the pressure applied to the steering wheel 210 may be detected, without limitations.

The pressure sensor 220 may detect the area of the pressure applied to the steering wheel 210. For example, the pressure sensor 220 may be gripped by the driver to detect the area of the pressure applied to the steering wheel 210.

Referring to FIG. 2, the steering control device 10 of the disclosure may include a controller 230 that determines the grip position based on the pressure applied to the steering wheel 210 detected by the pressure sensor 220, calculates a steering torque correction coefficient based on the linear distance from the rotation axis of the steering wheel 210 to the determined grip position, calculates a final steering torque by correcting the steering torque based on the steering torque correction coefficient, and controls the output of the motor based on the final steering torque.

The controller 230 may determine the grip position based on the pressure applied to the steering wheel 210 detected by the pressure sensor 220.

For example, the steering wheel 210 may be divided into a plurality of sections at predetermined intervals and, if the pressure applied to the steering wheel 210 is detected in a section of the plurality of sections, the controller 230 may determine the section as the grip position. Further, if the pressure applied to the steering wheel 210 is detected in two consecutive sections among the plurality of sections, the controller 230 may determine that the section larger in area of the two consecutive areas where the pressure is detected is the grip position. In other words, the controller 230 may determine that the section where the pressure is detected among the plurality of sections at predetermined intervals is the grip position.

The controller 230 may calculate the steering torque correction coefficient based on the linear distance from the rotation axis of the steering wheel 210 to the determined grip position.

The steering torque correction coefficient calculated by the controller 230 may be calculated based on the linear distance to the determined grip position, the number of grip positions, and a reference distance from the rotation axis of the steering wheel 210 to a preset grip position.

For example, the steering torque correction coefficient may be calculated by inputting the linear distance to the determined grip position, the number of grip positions, and the reference distance to the preset grip position to a preset equation. However, without limited thereto, the steering torque correction coefficient may be calculated by a matching table that is previously produced according to the linear distance to the determined grip position, the number of grip positions, and the reference distance to the preset grip position and stored.

The controller 230 may calculate the final steering torque differently based on the number of grip positions.

For example, if a first grip position is determined in the left area of the radial vertical line for the rotation axis of the steering wheel 210, and a second grip position is determined in the right area of the radial vertical line, the controller 230 may calculate a left steering torque correction coefficient based on a first linear distance from the rotation axis of the steering wheel 210 to the first grip position and calculate a right steering torque correction coefficient based on a second linear distance from the rotation axis of the steering wheel 210 to the second grip position. In this case, the controller 230 may separately calculate the left steering torque and right steering torque based on the first linear distance and the second linear distance, correct the left steering torque with the left steering torque correction coefficient and the right steering torque with the right steering torque correction coefficient, and calculate the final steering torque by summating the corrected left steering torque and the corrected right steering torque.

As another example, if the grip position is determined in either the left area or right area of the radial vertical line for the rotation axis of the steering wheel 210, the controller 230 may calculate the steering torque correction coefficient based on the linear distance from the rotation axis of the steering wheel 210 to the determined grip position, correct the steering torque with the steering torque correction coefficient, and calculate the corrected steering torque as the final steering torque.

The steering torque used to separately calculate the left steering torque and the right steering torque or the steering torque corrected with the steering torque correction coefficient may mean the torque detected by the torque sensor.

Accordingly, the controller 230 may calculate the final steering torque separately between the case where the first grip position is determined in the left area, and the second grip position is determined in the right area (the driver grips the steering wheel 210 with both hands) and the case where the grip position is determined in either the left area or right area (the driver grips the steering wheel 210 with one hand).

The controller 230 may control the operation of the motor based on the final steering torque. Accordingly, it is possible to enhance the driver's steering feeling by correcting the steering torque due to a difference in linear distance despite a difference in the linear distance from the rotation axis according to the position of the pressure applied to the steering wheel 210 shaped so that the linear distance from the rotation axis increases/decreases.

The steering control device 10 is applicable to the above-described steering control signal, but without limited thereto, is also applicable to steer-by-wire (SbW) systems.

Figure 3:
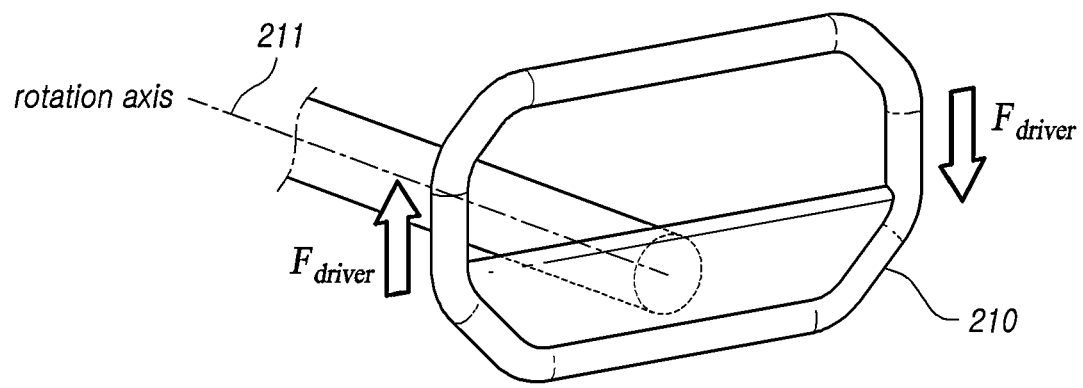
FIG. 3 is a view illustrating a steering wheel according to an embodiment.

FIG. 3 is a view illustrating a steering wheel 210 according to an embodiment.

Referring to FIG. 3, the steering control device 10 of the disclosure may include a steering wheel 210 shaped to increase/decrease in the linear distance from the rotation axis.

As autonomous vehicles are developed, the steering wheel 210 is used less frequently and is thus required to be stowed or folded for space utilization. In other words, when the vehicle is driven by the driver, the steering wheel 210 may be pulled out or unfolded and gripped by the driver, and when the vehicle is autonomously driven, the steering wheel 210 may be stowed or folded to increase the space utilization inside the vehicle.

Accordingly, the steering wheel 210 may come various shapes as well as the circular shape as conventional. For example, the steering wheel 210 may be provided in a shape, such as a gentle oval or an oval with an angled lower end.

If the steering wheel 210 is formed in an oval shape as described above, although the driver applies the same force to the steering wheel 210, the steering torque may be varied due to the difference from the rotation axis, and the steering feeling may be degraded, as compared with the steering wheel 210 formed in a circular shape. For example, referring to FIG. 3, if the user grips the steering wheel 210 on two opposite ends thereof and turns the steering wheel 210 with force $F_{driver}$, then the steering torque may be detected by the linear distance between the rotation axis 211 of the steering wheel 210 and the position of the steering wheel 210 gripped by the driver and the force applied by the driver, and the output of the motor may be controlled based on the detected steering torque, so that an assist torque may be generated. In other words, the steering torque may be varied depending on the linear distance between the position of the steering wheel 210 gripped by the driver and the rotation axis 211 of the steering wheel 210.

Accordingly, the distance from the rotation axis 211 of the steering wheel 210 may be varied depending on the position of the steering wheel 210 gripped by the driver, so that the steering torque may be varied. Thus, the generated assist torque may cause the driver to have an irregular steering feeling.

However, embodiments of the disclosure may also be applied to the steering wheel 210 formed in a circular shape. For example, although the steering wheel 210 is formed in a circular shape, if the rotation axis 211 of the steering wheel 210 is positioned off the center of the steering wheel 210, the distance between the position of the steering wheel 210 gripped by the driver and the rotation axis 211 of the steering wheel 210 may be inconstant. In other words, embodiments of the disclosure may be applied to any shape of the steering wheel 210 in which the linear distance from the rotation axis 211 increases/decreases, without limitations. To prevent degradation of steering feeling, the disclosure may include a pressure sensor 220 for detecting the pressure applied to the steering wheel 210. The pressure sensor 220 may transmit pressure information including the position and the strength of the pressure applied to the overall edge of the steering wheel 210 to the controller 230.

Figure 4:
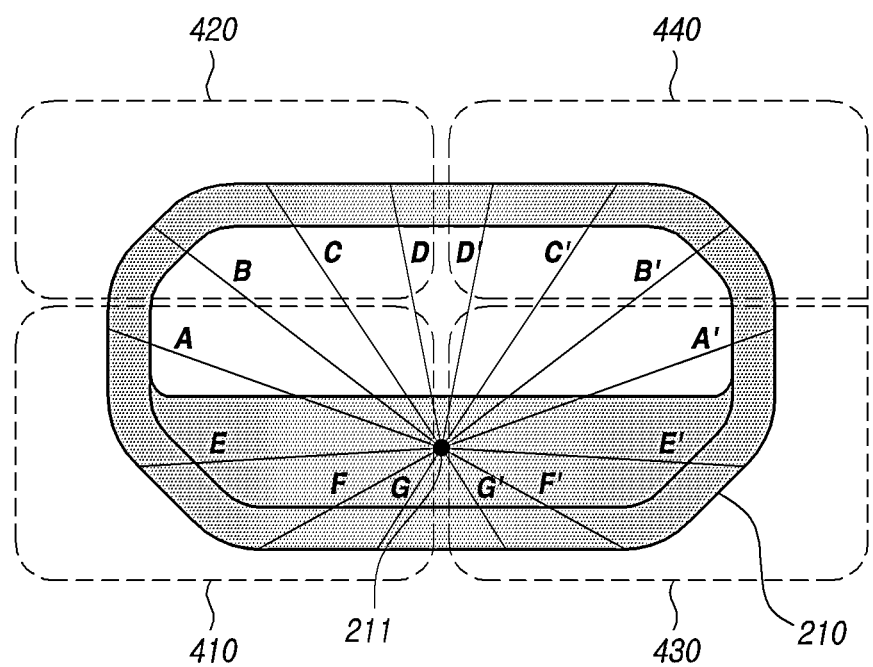
FIG. 4 is a view illustrating, in greater detail, the shape of a steering wheel according to an embodiment.

FIG. 4 is a view illustrating, in greater detail, the shape of a steering wheel 210 according to an embodiment.

FIG. 4 illustrates an example shape of the steering wheel 210. As described above, embodiments of the disclosure may be applied to any shape in which the linear distance from the rotation axis increases/decreases without limitations.

Referring to FIG. 4, the steering wheel 210 may be shaped to include a plurality of areas in which the linear distance increases/decreases depending on the position of the steering wheel 210 where pressure is applied from the rotation axis 211 of the steering wheel 210.

The plurality of areas may include a first area 410 in which the linear distance from the rotation axis 211 of the steering wheel 210 increases clockwise, a second area 420 in which the linear distance from the rotation axis 211 of the steering wheel 210 decreases clockwise, a third area 430 in which the linear distance from the rotation axis 211 of the steering wheel 210 increases counterclockwise, and a fourth area 440 in which the linear distance from the rotation axis 211 of the steering wheel 210 decreases counterclockwise.

For example, the area in which the linear distance between the rotation axis 211 and the steering wheel 210 increases clockwise from G of FIG. 4 to A of FIG. 4 may be the first area 410.

The area in which the linear distance between the rotation axis 211 and the steering wheel 210 decreases clockwise from B of FIG. 4 to D of FIG. 4 may be the second area 420.

The area in which the linear distance between the rotation axis 211 and the steering wheel 210 increases counterclockwise from G' of FIG. 4 to A' of FIG. 4 may be the third area 430.

The area in which the linear distance between the rotation axis 211 and the steering wheel 210 decreases counterclockwise from B' of FIG. 4 to D' of FIG. 4 may be the fourth area 440.

The above-described multiple areas are described with reference to the linear distance (A to G, A' to G) between the rotation axis 211 and the steering wheel 210 as briefly represented for convenience of description. The distance between the rotation axis 211 and the steering wheel 210 in each area may be set with respect to the outer surface of the steering wheel 210, but is not limited thereto. For example, the distance between the rotation axis 211 and the steering wheel 210 may also be set with respect to the inner surface of the steering wheel 210 or an intermediate position between the outer surface and the inner surface.

In an embodiment, the first area 410 and the third area 430 may be bilaterally symmetrical with respect to a predetermined straight line that passes through the rotation axis 211 of the steering wheel 210 and bisects the steering wheel 210 into the left area and the right area, and the second area 420 and the fourth area 440 may be bilaterally symmetrical with respect to the above-described straight line.

For example, the first area 410 and the third area 430 may be bilaterally symmetrical and the second area 420 and the fourth area 440 may be bilaterally symmetrical with respect to a predetermined straight line (not shown) passing through an intermediate point between G and G' of FIG. 4 and an intermediate point between D and D'. In other words, A and A' may have the same distance, and G and G' may have the same distance.

Figure 5:
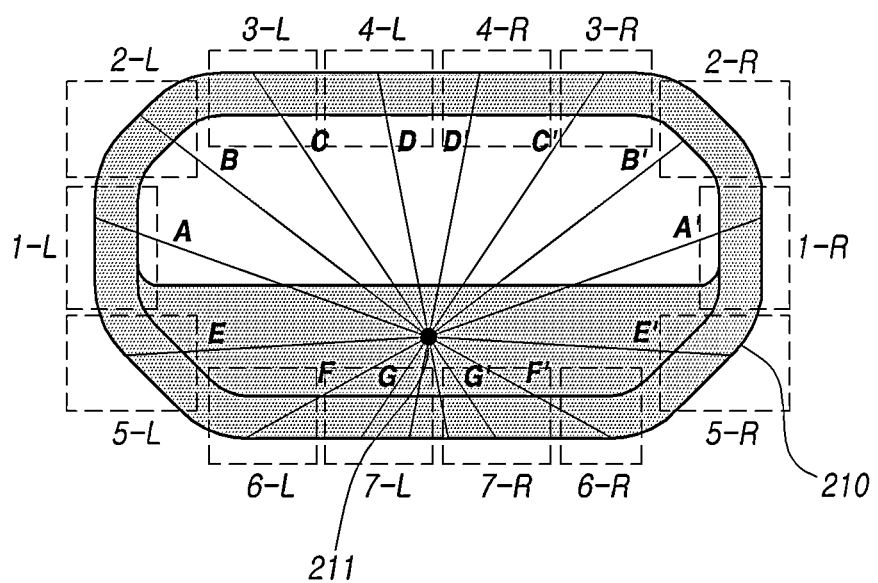
FIG. 5 is a view illustrating the position of a steering wheel, where pressure is applied, per section according to an embodiment.

FIG. 5 is a view illustrating the position of a steering wheel 210, where pressure is applied, per section according to an embodiment.

Referring to FIG. 5, the steering wheel 210 may be divided into a plurality of sections at predetermined intervals and, if the pressure applied to the steering wheel 210 is detected in a section of the plurality of sections, the controller 230 may determine the section as the grip position.

The steering wheel 210 may be divided into a plurality of sections at preset intervals. The interval may be set based on the linear distance from the rotation axis 211. In other words, the interval may be preset as a section including each point capable of distinguishing the linear distance from the rotation area 211.

If the pressure applied to the steering wheel 210 is detected in a section of the plurality of sections, the controller 230 may determine that the section is the grip position.

For example, if the pressure applied to the steering wheel 210 is detected in section 1-L and section 1-R among the plurality of sections by the pressure sensor 220 and pressure information is received from the pressure sensor 220, the controller 230 may determine that sections 1-L and 1-R are grip positions.

Figure 6:
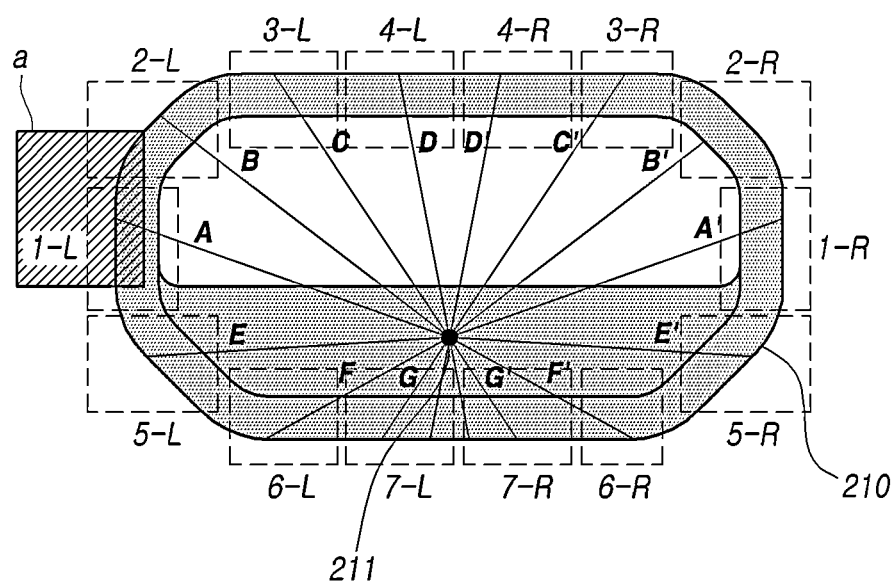
FIG. 6 is a view illustrating processing pressure recognized in a plurality of sections according to an embodiment.

As another example, if the pressure applied to the steering wheel 210 is detected only in section among the plurality of sections by the pressure sensor 220 and pressure information is received from the pressure sensor 220, the controller 230 may determine that section 1-L is the grip position. FIG. 6 is a view illustrating processing pressure recognized in a plurality of sections according to an embodiment.

Referring to FIG. 6, if the pressure applied to the steering wheel 210 is detected in two consecutive sections among the plurality of sections, the controller 230 may determine that the section larger in area of the two consecutive areas where the pressure is detected is the grip position.

For example, as shown in FIG. 6, if the pressure applied to the steering wheel 210 is detected in two consecutive sections 1-L and 2-L among the plurality of sections by the pressure sensor 220 and pressure information is received, the controller 230 may determine that section 1-L larger in area of the two consecutive sections is the grip position.

The steering torque correction coefficient may be calculated based on the linear distance to the determined grip position, the number of grip positions, and a reference distance from the rotation axis 211 of the steering wheel 210 to a preset grip position.

For example, the steering torque correction coefficient may be calculated by Equation 1 below.

$$\frac{2 \times \text{Default distance}}{\text{Grip number} \times \text{distance}} \quad \text{[Equation 1]}$$

In Equation 1, distance is the linear distance from the rotation axis 211 of the steering wheel 210 to the determined grip position, and Grip number is the number of grip positions determined. In Equation 1, Default distance is a reference distance from the rotation axis 211 of the steering wheel 210 to a preset grip position.

The linear distance from the rotation axis 211 of the steering wheel 210 to the determined grip position may be a linear distance that is preset corresponding to the grip position and is stored. Referring to FIGS. 5 and 6, as an example, if the grip position is determined as section 1-L, A which is the linear distance preset corresponding to section 1-L and stored may be the linear distance to the determined grip position. As another example, if the grip position is determined as section 2-L, B which is the linear distance preset corresponding to section 2-L and stored may be the linear distance to the determined grip position.

The number of grip positions may be the number of positions where the driver grips the steering wheel 210. For example, if the driver grips the steering wheel 210 with both hands, the number of grip positions may be 2 and, if the driver grips the steering wheel 210 with one hand, the number of grip positions may be 1.

The reference distance from the rotation axis 211 of the steering wheel 210 to the preset grip position may be a distance set based on the grip position where the driver normally grips the steering wheel 210. Referring to FIGS. 5 and 6, the grip positions where the driver grips the steering wheel 210 may be sections 2-L and 2-R in which case the reference distance may be set to B since B and B' are the same distance. However, without limited thereto, the reference distance may be set to E based on sections 5-L and 5-R which are the grip positions or may be set to A based on sections 1-L and 1-R which are grip positions farthest from the rotation axis 211 of the steering wheel 210.

An example in which the reference distance is A is described below, but embodiments of the disclosure are not limited thereto.

If a first grip position is determined in the left area of the radial vertical line for the rotation axis 211 of the steering wheel 210, and a second grip position is determined in the right area of the radial vertical line, the controller 230 may calculate a left steering torque correction coefficient based on a first linear distance from the rotation axis 211 of the steering wheel 210 to the first grip position and calculate a right steering torque correction coefficient based on a second linear distance from the rotation axis 211 of the steering wheel 210 to the second grip position. Further, the controller 230 may separately calculate the left steering torque and right steering torque based on the first linear distance and the second linear distance, correct the left steering torque with the left steering torque correction coefficient and the right steering torque with the right steering torque correction coefficient, and calculate the final steering torque by summating the corrected left steering torque and the corrected right steering torque.

Grip positions and the force applied to the steering wheel 210 by the driver are described as an example, but embodiments of the disclosure are not limited thereto.

If the driver grips the steering wheel 210 with both hands so that the number of grip positions is 2, embodiments of the disclosure may apply.

For example, the first grip position may be determined in section 1-L of the left area of the radial vertical line for the rotation axis 211 of the steering wheel 210, and the second grip position may be determined in section 2-R of the right area. In this case, the controller 230 may calculate the left steering torque correction coefficient as 1 by inputting A as the linear distance to section 1-L, 2 as the number of grip positions, and A as the reference distance in Equation 1 above. Further, the controller 230 may calculate the right steering torque correction coefficient as A/B by inputting B as the linear distance to section 2-R, 2 as the number of grip positions, and A as the reference distance in Equation 1 above.

Since the steering torque is a value measured by the torque sensor and is thus the torque summated based on the forces applied to the left area and right area of the steering wheel 210 and the respective distances, the steering torque should be calculated separately as the left steering torque and the right steering torque so that they each may be corrected. For example, in a case where $F_{driver}$ is applied to each of the left area and right area of the steering wheel 210 by the driver, the steering torque measured by the steering torque sensor is $(A+B)*F_{driver}$, and the first linear distance is A, and the second linear distance is B, the controller 230 may calculate the left steering torque as $A*F_{driver}$ and the right steering torque as $B*F_{driver}$.

Further, the controller 230 may correct the left steering torque by multiplying the left steering torque $A*F_{driver}$ by the left steering torque correction coefficient 1 and correct the right steering torque by multiplying the right steering torque $B*F_{driver}$ by the right steering torque correction coefficient A/B, and summate the corrected left steering torque $A*F_{driver}$ and the corrected right steering torque $A*F_{driver}$, yielding the final steering torque $2A*F_{driver}$.

If the driver grips the steering wheel 210 with one hand so that the number of grip positions is 1, embodiments of the disclosure may apply.

For example, if the grip position is determined in either the left area or right area of the radial vertical line for the rotation axis 211 of the steering wheel 210, the controller 230 may correct the steering torque with the steering torque correction coefficient and calculate the corrected steering torque as the final steering torque.

If the driver grips the steering wheel 210 with one hand, the grip position may be determined as section 2-L which is either the left area or right area of the steering wheel 210. In this case, the controller 230 may calculate the steering torque correction coefficient as 2A/B by inputting B as the linear distance to section 2-L, 1 as the number of grip positions, and A as the reference distance in Equation 1 above.

Since the steering torque is a value measured by the torque sensor and is thus the torque calculated based on the force applied to the left area or right area of the steering wheel 210 and the distance, the steering torque may be corrected even without dividing it into the left steering torque and the right steering torque. For example, if $F_{driver}$ is applied to the left or right area of the steering wheel 210 by the driver, the steering torque measured by the steering torque sensor is $B*F_{driver}$, and the linear distance is B, the controller 230 may correct the steering torque by multiplying the steering torque $B*F_{driver}$ by the steering torque correction coefficient 2A/B and calculate corrected $2A*F_{driver}$ as the final steering torque.

As described above, the controller 230 may calculate the final steering torque based on the linear distance to the determined grip position, the number of grip positions, and the steering torque, but is not limited thereto. For example, the controller 230 may also calculate the final steering torque based on a table previously stored based on the linear distance to the determined grip position, the number of grip positions, and the steering torque.

Table 1 below shows an example of the previously stored table.

TABLE 1

| No. | Grip number | Grip position | Linear distance | Driver's force | Steering torque before correction | Steering torque correction coefficient | Corrected steering torque | Final steering torque |
|---|---|---|---|---|---|---|---|---|
| 1 | 2 | 1-L | A | $F_{driver}$ | $A*F_{driver}$ | 1 | $A*F_{driver}$ | $2AF_{driver}$ |
|  |  | 1-R | A | $F_{driver}$ | $A*F_{driver}$ | 1 | $A*F_{driver}$ |  |
| 2 | 2 | 2-L | B | $F_{driver}$ | $B*F_{driver}$ | A/B | $A*F_{driver}$ | $2AF_{driver}$ |
|  |  | 2-R | B | $F_{driver}$ | $B*F_{driver}$ | A/B | $A*F_{driver}$ |  |
| 3 | 2 | 3-L | C | $F_{driver}$ | $C*F_{driver}$ | A/C | $A*F_{driver}$ | $2AF_{driver}$ |
|  |  | 3-R | C | $F_{driver}$ | $C*F_{driver}$ | A/C | $A*F_{driver}$ |  |
| 4 | 2 | 1-L | A | $F_{driver}$ | $A*F_{driver}$ | 1 | $A*F_{driver}$ | $2AF_{driver}$ |
|  |  | 2-R | B | $F_{driver}$ | $B*F_{driver}$ | A/B | $A*F_{driver}$ |  |
| 5 | 2 | 3-L | C | $F_{driver}$ | $C*F_{driver}$ | A/C | $A*F_{driver}$ | $2AF_{driver}$ |
|  |  | 6-R | F | $F_{driver}$ | $F*F_{driver}$ | A/F | $A*F_{driver}$ |  |
| 6 | 1 | 2-L | B | $F_{driver}$ | $B*F_{driver}$ | 2A/B | $(A+A)F_{driver}$ | $2AF_{driver}$ |
| 7 | 1 | 3-R | C | $F_{driver}$ | $C*F_{driver}$ | 2A/C | $(A+A)F_{driver}$ | $2AF_{driver}$ |

A computer system (not shown), such as the steering control device 10, may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 7:
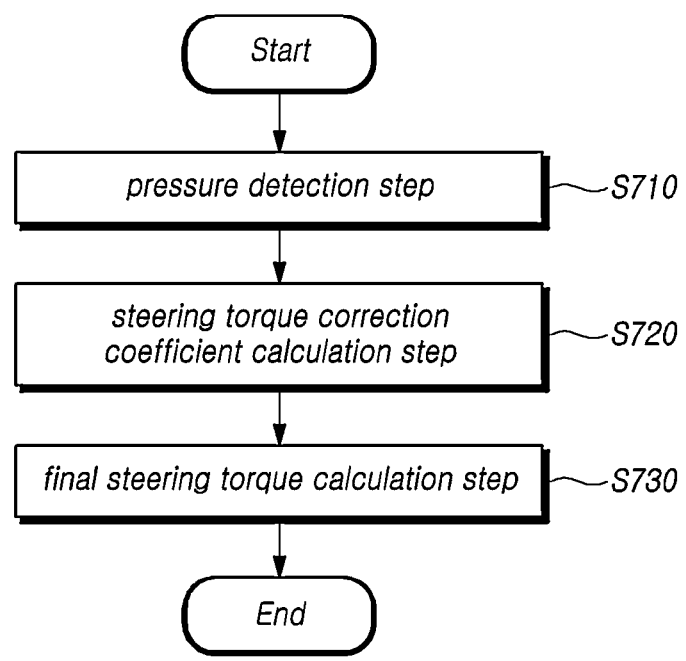
FIG. 7 is a flowchart illustrating a steering control method according to an embodiment of the disclosure.

FIG. 7 is a flowchart illustrating a steering control method according to an embodiment of the disclosure.

Referring to FIG. 7, according to the disclosure, a steering control method may comprise a pressure detection step S210 detecting a pressure applied to a steering wheel shaped to increase/decrease in a linear distance from a rotation axis, a steering torque correction coefficient calculation step S720 determining a grip position based on the detected pressure applied to the steering wheel and calculating a steering torque correction coefficient based on a linear distance from the rotation axis of the steering wheel to the determined grip position, and a final steering torque calculation step S730 calculating a final steering torque by correcting a steering torque based on the steering torque correction coefficient. The steering wheel may be shaped so that the linear distance from the rotation axis increases/decreases. For example, the steering wheel may be shaped to include a plurality of areas in which the linear distance increases/decreases depending on the position of the steering wheel where pressure is applied from the rotation axis of the steering wheel. In this case, the plurality of areas may include a first area in which the linear distance from the rotation axis of the steering wheel increases clockwise, a second area in which the linear distance from the rotation axis of the steering wheel decreases clockwise, a third area in which the linear distance from the rotation axis of the steering wheel increases counterclockwise, and a fourth area in which the linear distance from the rotation axis of the steering wheel decreases counterclockwise.

However, without limited thereto, embodiments of the disclosure may be applied to any shape in which the linear distance from the rotation axis of the steering wheel may increase/decrease, without limitations.

In the pressure detection step, the pressure applied to the steering wheel may be detected by the pressure sensor. The pressure sensor may be provided in any position where the pressure applied to the steering wheel 210 may be detected, without limitations.

Although not shown in FIG. 7, the steering control method may further include controlling the output of the motor based on the final steering torque. Accordingly, it is possible to enhance the driver's steering feeling by correcting the steering torque due to a difference in linear distance despite a difference in the linear distance from the rotation axis according to the position of the pressure applied to the steering wheel shaped so that the linear distance from the rotation axis increases/decreases.

Figure 8:
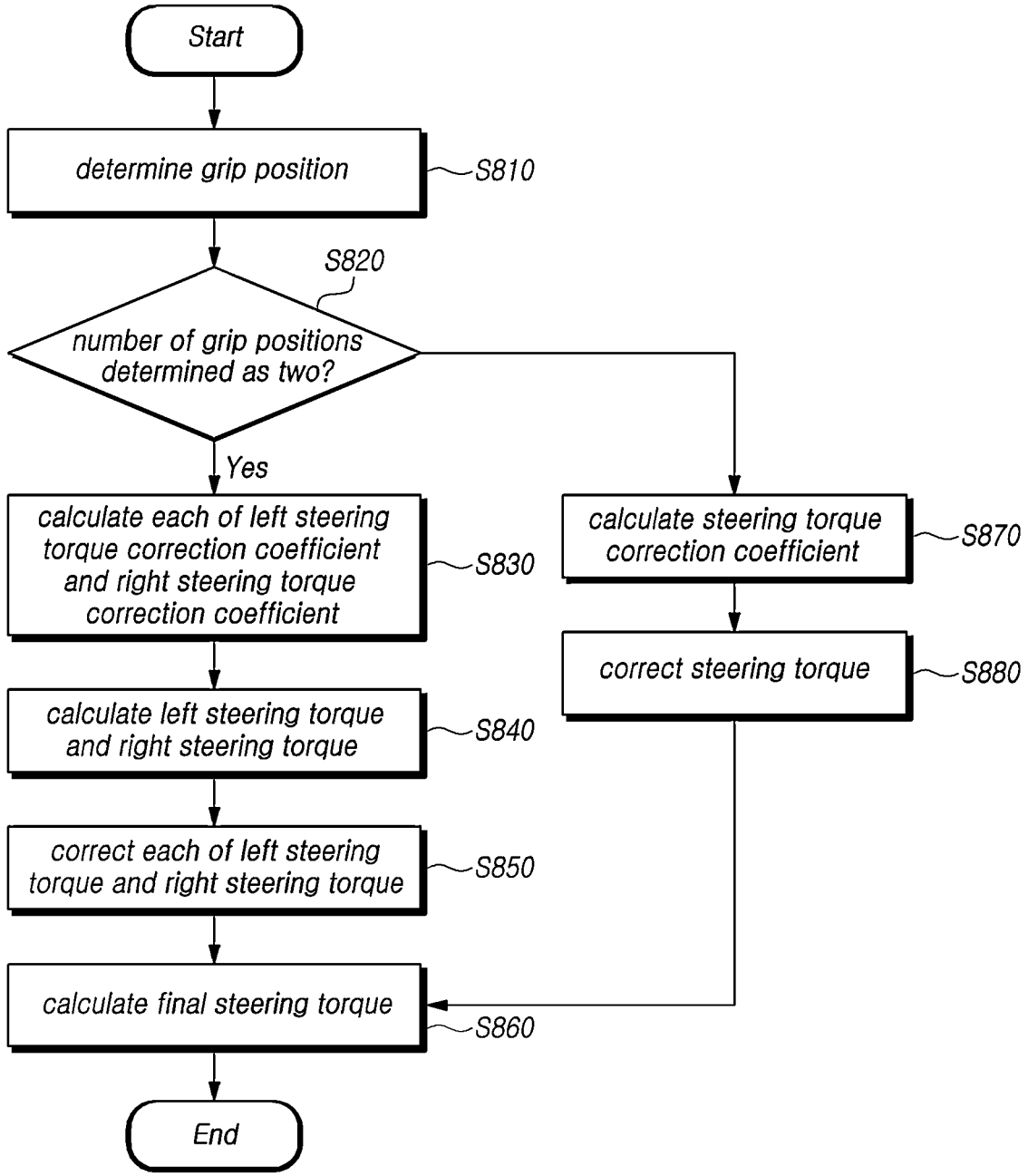
FIG. 8 is a view illustrating, in greater detail, steps 720 and 730 according to an embodiment.

FIG. 8 is a view illustrating, in greater detail, steps 720 and 730 according to an embodiment.

Referring to FIG. 8, the steering control method may determine the grip position based on the detected pressure applied to the steering wheel (S810).

For example, the steering wheel may be divided into a plurality of sections at predetermined intervals and, if the pressure applied to the steering wheel is detected in a section of the plurality of sections, the steering torque correction coefficient calculation step may determine the section as the grip position. Further, if the pressure applied to the steering wheel is detected in two consecutive sections among the plurality of sections, the steering torque correction coefficient calculation step may determine that the section larger in area of the two consecutive areas where the pressure is detected is the grip position. In other words, the steering torque correction coefficient calculation step may determine that the section where the pressure is detected among the plurality of sections at predetermined intervals is the grip position.

The steering torque correction coefficient may be calculated based on the linear distance to the determined grip position, the number of grip positions, and a reference distance from the rotation axis of the steering wheel to a preset grip position.

For example, the steering torque correction coefficient may be calculated by inputting the linear distance to the determined grip position, the number of grip positions, and the reference distance to the preset grip position to a preset equation.

However, without limited thereto, the steering torque correction coefficient may be calculated by a matching table that is previously produced according to the linear distance to the determined grip position, the number of grip positions, and the reference distance to the preset grip position and stored.

The steering torque correction coefficient calculation step may calculate the final steering torque differently based on the number of grip positions. For example, the steering torque correction coefficient calculation step may identify whether the number of grip positions is determined as two (S820).

For example, if a first grip position is determined in the left area of the radial vertical line for the rotation axis of the steering wheel, and a second grip position is determined in the right area of the radial vertical line, the steering torque correction coefficient calculation step may calculate a left steering torque correction coefficient based on a first linear distance from the rotation axis of the steering wheel to the first grip position and calculate a right steering torque correction coefficient based on a second linear distance from the rotation axis of the steering wheel to the second grip position (S830).

In this case, the steering torque correction coefficient calculation step may separately calculate the left steering torque and right steering torque based on the first linear distance and the second linear distance (S840), correct the left steering torque with the left steering torque correction coefficient and the right steering torque with the right steering torque correction coefficient (S850), and calculate the final steering torque by summating the corrected left steering torque and the corrected right steering torque (S860).

In the steering torque correction coefficient calculation step, the case where the number of grip positions is not determined as two may mean the case where the number of grip positions is determined as one.

For example, if the grip position is determined in either the left area or right area of the radial vertical line for the rotation axis of the steering wheel, the steering torque correction coefficient calculation step may calculate the steering torque correction coefficient based on the linear distance from the rotation axis of the steering wheel to the determined grip position (S870), correct the steering torque with the steering torque correction coefficient (S880), and calculate the corrected steering torque as the final steering torque (S860). In other words, if the number of grip positions is determined as one, the corrected steering torque may be the final steering torque.

The steering torque used to separately calculate the left steering torque and the right steering torque or the steering torque corrected with the steering torque correction coefficient may mean the torque detected by the torque sensor.

As described above, according to the disclosure, the steering control device and method may enhance the driver's steering feeling by correcting the steering torque due to a difference in linear distance despite a difference in the linear distance from the rotation axis according to the position of the pressure applied to the steering wheel shaped so that the linear distance from the rotation axis increases/decreases.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device, comprising:
   a steering wheel shaped to increase/decrease in a linear distance to a rotation axis;
   a pressure sensor provided in the steering wheel to detect a pressure applied to the steering wheel; and
   a controller determining a grip position based on the pressure applied to the steering wheel detected by the pressure sensor, calculating a steering torque correction coefficient based on a variable linear distance from the rotation axis of the steering wheel to the determined grip position, correcting a steering torque based on the steering torque correction coefficient to calculate a final steering torque, and controlling an output of a motor based on the final steering torque, wherein the steering torque correction coefficient is calculated to be inversely proportional to the variable linear distance from the rotation axis of the steering wheel to the determined grip position.

2. The steering control device of claim 1, wherein the steering wheel is provided in a shape including a plurality of areas increasing/decreasing in the variable linear distance depending on a position of the steering wheel, where the pressure is applied, from the rotation axis of the steering wheel, and wherein the plurality of areas include:
   a first area in which the variable linear distance from the rotation axis of the steering wheel increases clockwise;
   a second area in which the variable linear distance from the rotation axis of the steering wheel decreases clockwise;
   a third area in which the variable linear distance from the rotation axis of the steering wheel increases counterclockwise; and
   a fourth area in which the variable linear distance from the rotation axis of the steering wheel decreases counterclockwise.

3. The steering control device of claim 1, wherein the steering wheel is divided into a plurality of sections at a preset interval, and wherein if the pressure applied to the steering wheel is detected in a section among the plurality of sections, the controller determines that the section is the grip position.

4. The steering control device of claim 3, wherein if the pressure applied to the steering wheel is detected in two consecutive sections among the plurality of sections, the controller determines that a section larger in area of the two consecutive areas where the pressure is detected is the grip position.

5. The steering control device of claim 1, wherein the steering torque correction coefficient is calculated based on a linear distance to the determined grip position, a number of grip positions, and a reference distance from the rotation axis of the steering wheel to a preset grip position.

6. The steering control device of claim 1, wherein if a first grip position and a second grip position are determined in a left area and a right area, respectively, with respect to a radial vertical line for the rotation axis of the steering wheel, the controller calculates a left steering torque correction coefficient based on a first variable linear distance from the rotation axis of the steering wheel to the first grip position and calculates a right steering torque correction coefficient based on a second variable linear distance from the rotation axis of the steering wheel to the second grip position.

7. The steering control device of claim 6, wherein the controller calculates the steering torque separately as a left steering torque and a right steering torque based on the first variable linear distance and the second variable linear distance, corrects the left steering torque with the left steering torque correction coefficient, corrects the right steering torque with the right steering torque correction coefficient, and summates the corrected left steering torque and the corrected right steering torque to calculate the final steering torque.

8. The steering control device of claim 1, wherein if the grip position is determined in either a left area or a right area with respect to a radial vertical line for the rotation axis of the steering wheel, the controller corrects the steering torque with the steering torque correction coefficient and calculates the corrected steering torque as the final steering torque.

9. The steering control device of claim 1, wherein the rotation axis of the steering wheel is positioned off from a center of the steering wheel.

10. A steering control method, comprising:
    a pressure detection step detecting a pressure applied to a steering wheel shaped to increase/decrease in a linear distance from a rotation axis;
    a steering torque correction coefficient calculation step determining a grip position based on the detected pressure applied to the steering wheel and calculating a steering torque correction coefficient based on a variable linear distance from the rotation axis of the steering wheel to the determined grip position, wherein the steering torque correction coefficient is calculated to be inversely proportional to the variable linear distance from the rotation axis of the steering wheel to the determined grip position; and
    a final steering torque calculation step calculating a final steering torque by correcting a steering torque based on the steering torque correction coefficient.

11. The steering control method of claim 10, wherein the steering wheel is provided in a shape including a plurality of areas increasing/decreasing in the variable linear distance depending on a position of the steering wheel, where the pressure is applied, from the rotation axis of the steering wheel, and wherein the plurality of areas include:
    a first area in which the variable linear distance from the rotation axis of the steering wheel increases clockwise;

a second area in which the variable linear distance from the rotation axis of the steering wheel decreases clockwise;

a third area in which the variable linear distance from the rotation axis of the steering wheel increases counterclockwise; and a fourth area in which the variable linear distance from the rotation axis of the steering wheel decreases counterclockwise.

12. The steering control method of claim 10, wherein the steering wheel is divided into a plurality of sections at a preset interval, and wherein if the pressure applied to the steering wheel is detected in a section among the plurality of sections, the steering torque correction coefficient calculation step determines that the section is the grip position.

13. The steering control method of claim 12, wherein if the pressure applied to the steering wheel is detected in two consecutive sections among the plurality of sections, the steering torque correction coefficient calculation step determines that a section larger in area of the two consecutive areas where the pressure is detected is the grip position.

14. The steering control method of claim 10, wherein the steering torque correction coefficient is calculated based on a linear distance to the determined grip position, a number of grip positions, and a reference distance from the rotation axis of the steering wheel to a preset grip position.

15. The steering control method of claim 10, wherein if a first grip position and a second grip position are determined in a left area and a right area, respectively, with respect to a radial vertical line for the rotation axis of the steering wheel, the steering torque correction coefficient calculation step calculates a left steering torque correction coefficient based on a first variable linear distance from the rotation axis of the steering wheel to the first grip position and calculates a right steering torque correction coefficient based on a second variable linear distance from the rotation axis of the steering wheel to the second grip position.

16. The steering control method of claim 15, wherein the final steering torque calculation step calculates the steering torque separately as a left steering torque and a right steering torque based on the first variable linear distance and the second variable linear distance, corrects the left steering torque with the left steering torque correction coefficient, corrects the right steering torque with the right steering torque correction coefficient, and summates the corrected left steering torque and the corrected right steering torque to calculate the final steering torque.

17. The steering control method of claim 10, wherein if the grip position is determined in either a left area or a right area with respect to a radial vertical line for the rotation axis of the steering wheel, the final steering torque calculation step corrects the steering torque with the steering torque correction coefficient and calculates the corrected steering torque as the final steering torque.

18. The steering control method of claim 10, wherein the rotation axis of the steering wheel is positioned off from a center of the steering wheel.

* * * * *